US010164892B2

(12) United States Patent
Fusco et al.

(10) Patent No.: US 10,164,892 B2
(45) Date of Patent: Dec. 25, 2018

(54) OVERHEAD MANAGEMENT FOR VIRTUAL MACHINES (71) Applicant: Red Hat Israel, Ltd., Ra'anana (IL)

(72) Inventors: Francesco Fusco, Zurich (CH); Thomas Graf, Fehraltorf (CH); Michael Tsirkin, Raanana (IL)

(73) Assignee: RED HAT ISRAEL, LTD., Ra'anana (IL)

( * ) Notice: Subject to any disclaimer, the term of this patent is extended or adjusted under 35 U.S.C. 154(b) by 48 days.

(21) Appl. No.: 14/145,254

(22) Filed: Dec. 31, 2013

(65) Prior Publication Data

US 2015/0188833 A1 Jul. 2, 2015

(51) Int. Cl.
*H04L 12/805* (2013.01)
*G06F 9/455* (2018.01)

(52) U.S. Cl.
CPC .......... *H04L 47/36* (2013.01); *G06F 9/45533* (2013.01); *G06F 9/45558* (2013.01); *G06F 2009/4557* (2013.01); *G06F 2009/45566* (2013.01)

(58) Field of Classification Search
CPC .... G06F 9/455; G06F 9/45533; G06F 9/4555; G06F 9/45558; H04L 47/36; H04L 47/365
USPC .................. 717/134, 135, 138; 713/2; 718/1
See application file for complete search history.

(56) References Cited

U.S. PATENT DOCUMENTS

| | | | |
|---|---|---|---|
| 7,802,000 B1* | 9/2010 | Huang et al. .................. 709/228 |
| 8,117,554 B1* | 2/2012 | Grechishkin et al. ........ 715/764 |
| 8,892,706 B1* | 11/2014 | Dalal ............................. 709/223 |
| 9,660,902 B2* | 5/2017 | Suzuki .................... H04L 45/28 |
| 2006/0037072 A1* | 2/2006 | Rao ........................ H04L 1/1854 726/14 |
| 2007/0268918 A1* | 11/2007 | Gopi ................... H04L 12/4633 370/401 |
| 2008/0101382 A1* | 5/2008 | Bannerjee ............... H04L 47/10 370/400 |
| 2010/0058051 A1* | 3/2010 | Imai ..................... G06F 9/45537 713/152 |
| 2014/0123140 A1* | 5/2014 | Motoki ............... H04L 41/0806 718/1 |
| 2014/0241144 A1* | 8/2014 | Kashyap ............... H04L 47/365 370/216 |

(Continued)

OTHER PUBLICATIONS

Tafa, I., et al., The Performance between XEN-HVM, XEN-PV and Open-VZ during live-migration, (IJACSA) International Journal of Advanced Computer Science and Applications, vol. 2, No. 9, 2011, pp. 126-132, [retrieved on Apr. 23, 2016], Retrieved from the Internet: <URL:http://www.ijacsa.thesai.org>.*

(Continued)

*Primary Examiner* — Geoffrey R St Leger (74) *Attorney, Agent, or Firm* — Haynes and Boone, LLP (57) ABSTRACT

A method includes loading a guest virtual machine onto a host system, determining, with the host system, an encapsulation method to be used in association with a virtual network associated with the guest virtual machine, determining an overhead value based on the encapsulation method, determining an adjusted maximum transmission unit (MTU) value based on the overhead value, and passing, information related to the adjusted MTU value from the host system to the guest virtual machine.

17 Claims, 6 Drawing Sheets

(56) References Cited

U.S. PATENT DOCUMENTS

2015/0023146 A1\* 1/2015 Suzuki .................... H04L 45/28
370/216
2015/0229574 A1\* 8/2015 Chiba ................... H04L 47/365
370/470

OTHER PUBLICATIONS

Matthews, J., et al., Running Xen: A Hands-on Guide to the Art of Virtualization, Apr. 10, 2008, 646 pages, [retrieved on Jan. 4, 2017], Retrieved from the Internet: <URL:https://lists.xenproject.org/archives/html/xen-users/2009-10/pdff8LQ6wakeS.pdf>.\*

Wray, M., Virtual Networks for Virtual Machines, Dec. 13, 2005, 3 pages, [retrieved on Apr. 23, 2016], Retrieved from the Internet: <URL:https://github.com/avsm/xen-unstable/blob/nnaster/tools/vnet/doc/vnet-xend.txt>.\*

Pu, X., et al., A modeling of network I/O efficiency in Xen virtualized clouds, International Conference on Electronics, Communications and Control (ICECC), 2011, pp. 1831-1834, [retrieved on Aug. 6, 2018], Retrieved from the Internet: <URL:http://ieeexplore.ieee.org/>.\*

Farinacci, et al, "Generic Routing Encapsulation", http://tools.ietf.org/html/rfc2784 Mar. 2000, 9 pgs.

C. Wright, et al, "Vxlan: A Framework for Overlaying Virtualized Layer 2 Networks Over Layer 3 Networks", http:/tools.ietf.org/html/draft-mahalingam-dutt-dcops-vxlan-06, Nov. 5, 2013, 15 pgs.

\* cited by examiner

OVERHEAD MANAGEMENT FOR VIRTUAL MACHINES

The present disclosure relates generally to a virtual machines running in a virtual network environment, and more particularly to overhead management of network traffic.

Large datacenters often include multiple host systems that host several virtual machines, which are often referred to as guests. The guest virtual machines may provide an operating system environment and execute various software applications like physical machines. In many cases, a particular entity may have control of several guest virtual machines being run by the host system. Each of these virtual machines may be connected to each other on a virtual network. Moreover, the virtual network may be separate from other virtual networks that connect guest virtual machines belonging to other entities. Thus, each entity may be presented with a virtual network having several virtual machines and be unaware of any other virtual machines being run by the host system.

In order to present these virtual networks and virtual machines to a user in a transparent manner, a technique referred to as encapsulation is used. Encapsulation refers to the process of adding additional information in front of, and at the end of, a network packet. A packet is the basic unit of data that is transmitted by a network. In many cases, the networking protocol being used defines a maximum size of the packets. This maximum size is referred to as the maximum transmission unit (MTU). For example, a particular link layer network protocol, e.g. Ethernet, may define an MTU of 1500 bytes.

The host system uses encapsulation to add additional information to the packet header after the virtual machine has transmitted the packet. This additional information, which is often referred to as encapsulation overhead, or simply overhead, provides routing instructions for navigating the virtual network. Before the packet reaches its virtual machine destination, this additional information is removed. Thus, the virtual machines are unaware of the existence of the additional information.

One problem that arises with such a setup is that sometimes the overhead causes the packet length to exceed the MTU. Networking protocols often dictate that if a packet that exceeds the MTU is received, it is to be dropped or returned to its source. This can cause significant problems with the virtual network environment. Accordingly, it is desirable to have a virtual network environment where the MTU is not exceeded due to encapsulation overhead.

SUMMARY

According to certain illustrative examples, a method includes loading a guest virtual machine onto a host system, determining, with the host system, an encapsulation method to be used in association with a virtual network associated with the guest virtual machine, determining an overhead value based on the encapsulation method, determining an adjusted maximum transmission unit (MTU) value based on the overhead value, and passing, information related to the adjusted MTU value from the host system to the guest virtual machine.

According to certain illustrative examples, a method includes loading drivers for a virtual network device of a guest virtual machine running on a host system. The method further includes, with the guest virtual machine, receiving information from the host system, the information related to an adjusted maximum transmission unit (MTU) value, the adjusted MTU value being based on an overhead value associated with an encapsulation method used by a virtual network associated with the guest virtual machine. The method further includes, with the guest virtual machine, implementing the adjusted MTU value.

According to certain illustrative examples, a virtual network environment includes at least one host system and a plurality of guest virtual machines running on the host system, the guest virtual machines being separated into virtual networks in a manner that is transparent to the guest virtual machines. The host system is to determine an overhead value based on an encapsulation method used by a virtual network associated with the plurality of virtual machines, and pass an adjusted maximum transmission unit (MTU) value to the guest virtual machine, the adjusted MTU value based on the overhead value.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to have a virtual network environment where the MTU is not exceeded due to encapsulation overhead. According to methods and systems described herein, the MTU used by the host system's virtual networking protocols is provided to the guest when the guest virtual machine is first loaded onto the host system. In one example, the host system provides an adjusted MTU based on the known overhead.

For example, if the networking protocols provide for an MTU of 1500 bytes, and the encapsulation overhead takes up 20 bytes, then the adjusted MTU provided to the guest machine would be 1480 bytes. Thus, if the guest virtual machine adheres to the adjusted MTU, and the encapsulation overhead is 20 bytes, then there will be no packets that have a total length that exceeds the host MTU of 1500.

Figure 1:
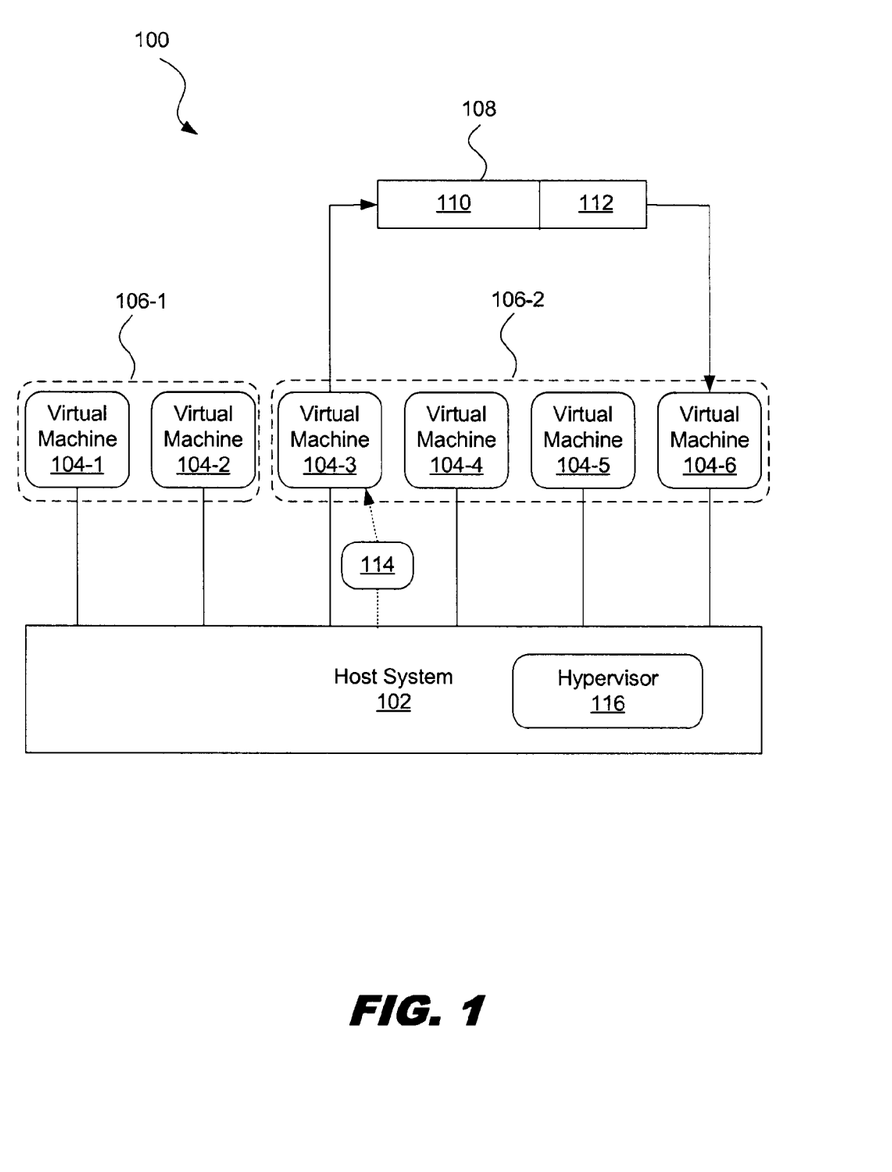
FIG. 1 is a diagram showing an illustrative virtual network environment, according to one example of principles described herein.

FIG. 1 is a diagram showing an illustrative virtual network environment 100. According to the present example, the virtual network environment 100 includes a host system 102 with a hypervisor 116. The host system 102 hosts a number of guest virtual machines 104. The guest virtual machines 104 are segmented into different virtual networks 106.

The host system 102 may be one of several host systems within a datacenter. The host system 102 provides the physical hardware to run the guest virtual machines 104. The physical hardware includes processors and memory. Thus, any software executed by a virtual machine 104 is ultimately executed by the processors of the host system 102.

The hypervisor 116 is a piece of software that manages the multiple virtual machines 104 hosted by the host system 102. In one example, the host system 102 has its own operating system and the hypervisor 116 runs within that operating system. The hypervisor 116 then provides multiple operating system environments or virtual platforms for the multiple guest virtual machines 104.

In some examples, the host system 102 does not have its own operating system. Rather the hypervisor 116 interacts directly with the hardware of the host system 102 to provide computing resources to the virtual machines 104 that are managed by the hypervisor 116. This may be referred to as a bare metal or native setup.

A virtual machine 104 is a piece of software that emulates or executes other software programs like a physical computing system. Use of virtual machines 104 can provide a number of advantages. For example, multiple operating system environments can co-exist on the same host system 102. Moreover, these different operating system environments are isolated from each other. Additionally, a virtual machine 104 can provide an instruction set architecture (ISA) that is different from the actual ISA of the hardware of the host system 102.

Each of the virtual machines 104 may be placed within a specific virtual network. For example, virtual machines 104-1 and 104-2 are in the first virtual network 106-1. Additionally, virtual machines 104-3, 104-4, 104-5, and 104-6 are in the second virtual network 106-2. The different virtual networks 106 may be segmented according to the entity having control of those virtual machines.

For example, the datacenter may enter into business agreements to provide a number of virtual machines 104 to a customer. The customer may have use of multiple virtual machines 104 running on the host system 102. The customer may desire that these different virtual machines 104 be able to interact with each other in the same manner that physical machines interact with each other over a network. Moreover, the customer may want their virtual machines 104 isolated from the virtual machines of other customers. Thus, a number of virtual machines for a particular customer can be put on a single virtual network 106 that is isolated from other networks.

A virtual network 106 is a network that is made of virtual links rather than physical links. A virtual network 106 can be used to connect multiple virtual machines 104 together. In some cases, the virtual network may exist entirety within the hypervisor 116. Virtual networks 106 may still use the same networking protocols used by physical networks.

Based on the virtual environment in which the virtual network operates, there may be additional overhead required to run the virtual network 106. It is desirable to have the virtual network 106 operate in a transparent manner. This means that the virtual machines 104 are unaware of the underlying virtual and physical infrastructure used for the virtual network 106. For example, a virtual network may exist between multiple virtual machines which may be running on different host systems within a datacenter. Thus, a mechanism is used to properly route packets from one virtual machine to another through the virtual network environment.

As described above, encapsulation is used to properly route packets across the virtual network environment. Specifically, additional routing information is added to a data packet after it is transmitted by a virtual machine. That additional routing information is removed before it is delivered to the destination virtual machine. Thus, the virtual machines are unaware of its existence.

A data packet 108 includes the main portion of data being transmitted, which is referred to as the payload 110. The data packet 108 also includes the routing information that informs network equipment how to handle the data packet 108. This routing information is often referred to as overhead 112.

The encapsulation process used by the virtual network environment adds additional overhead 110 to every data packet 108 being handled by the virtual network 106. In some cases, this additional encapsulation can cause the overall length of the data packet to exceed a predefined MTU. Various networking protocols dictate that if a packet exceeds the MTU, the packet is to be dropped or fragmented, both of which will cause problems in the virtual network performance.

According to principles described herein, the host system 102 passes data 114 to the virtual machines. This data 114 may instruct the virtual machines how to adjust the MTU. In one example, the data 114 may be an adjusted MTU that accounts for the overhead. For example, if the host MTU is 1500 bytes, and the overhead of the virtual network encapsulation method is 40 bytes, then the data 114 may include an adjusted MTU of 1460 bytes. Thus, if a virtual machine 104 enforces this adjusted MTU of 1460 bytes, then data packets 108 transmitted from that virtual machine 104 will not exceed the MTU due to additional encapsulation overhead.

In some examples, the MTU data 114 may be first passed from the host system 102 to a virtual machine 104 when the virtual machine 104 is first loaded. In some cases, the host MTU for the host system 102 may change. This change may be caused by a variety of different situations. Thus, the host system 102 will have to inform the virtual machines 104 of this change.

For example, the host MTU may change from 1500 bytes to 1400 bytes. Additionally, the overhead for the encapsulation methods being used may be 40 bytes. The original adjusted MTU provided to the virtual machine 104 would be 1460 bytes (1500–40). But, with the new host MTU, the adjusted MTU should be 1360 bytes (1400–40). Thus, the host system 102 should notify the virtual machine 104 of this new adjusted MTU.

In some examples, the overhead value of the encapsulation method may change. For example, the host system 102 may switch to a different type of networking protocol or decide to use a different encapsulation method with a different overhead value. In one example, the host MTU is 1500 bytes. The original overhead value may change from 40 bytes to 60 bytes. Thus, while the original adjusted MTU is 1460 bytes (1500–40), the new adjusted MTU value is 1440 bytes (1500–60). This new adjusted MTU value should be passed to the virtual machine 104.

In some examples, a virtual machine may migrate from one host system to another. In some cases, the new host system may use a different amount of overhead than the previous host system. Thus, the virtual machine can be provided with a new adjusted MTU for the new environment. Various other situations in which the MTU value or overhead value may change. In such cases, the virtual machines 104 can be notified of the new MTU values accordingly.

Figure 2A:
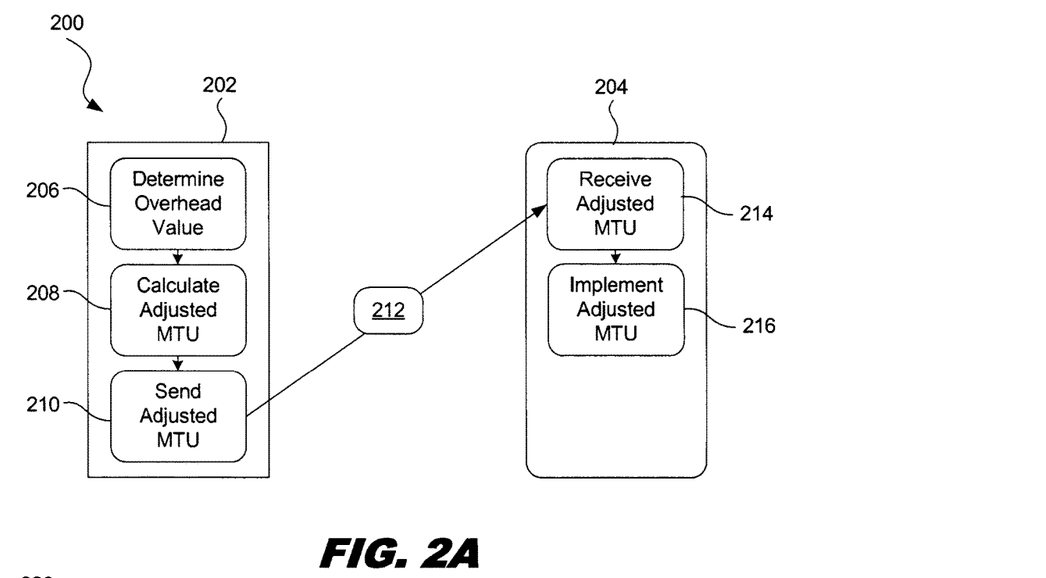
FIG. 2A is a diagram showing an illustrative transfer of MTU data from the host to the guest, according to one example of principles described herein.

FIG. 2A is a diagram showing an illustrative transfer of MTU data from the host to the guest. FIG. 2A illustrates a set of steps performed by the host system 202 and a set of steps performed by the virtual machine 204.

According to the present example, the host system determines 206 the overhead value. The overhead value is the number of bytes of overhead that is used by whatever encapsulation technique is used by the virtual networks connecting the various virtual machines running on the host system 202. The host system 202 knows this information because the host system 202 runs the virtual network environment. For example, the host system 202 runs the hypervisor which may define the virtual network environment and therefore the encapsulation method used for the virtual networks.

The host system 202 also calculates 208 the adjusted MTU value. This may be a simple calculation. Specifically, the calculation may be the host MTU minus the overhead value. As described above, if the host MTU is 1500 bytes and the overhead value is 40 bytes, then the adjusted MTU is 1460 bytes.

The host system 202 also sends 210 the adjusted MTU value to the virtual machine 204. This may be done in a variety of ways. For example, as will be described in further detail below, the adjusted MTU value 212 may be passed to the virtual machine 204 during the driver loading process. The virtual machine 204 receives 214 the adjusted MTU value 212 through whatever mechanism is used to pass the value 212 form the host system 202 to the virtual machine 204.

The virtual machine 204 can then implement 216 the adjusted MTU value. In some cases, the virtual machine is not aware that the MTU value is an adjusted MTU value. Rather, the virtual machine 204 receives the MTU value 212 from the host machine and adheres to that value as it would if the adjusted MTU value were the host MTU value. Because the virtual machine will not send out a data packet that is larger than the adjusted MTU, the addition of the encapsulation overhead will not cause the encapsulated data packet to exceed the host MTU used by the networking protocols used to transmit the data packets.

Figure 2B:
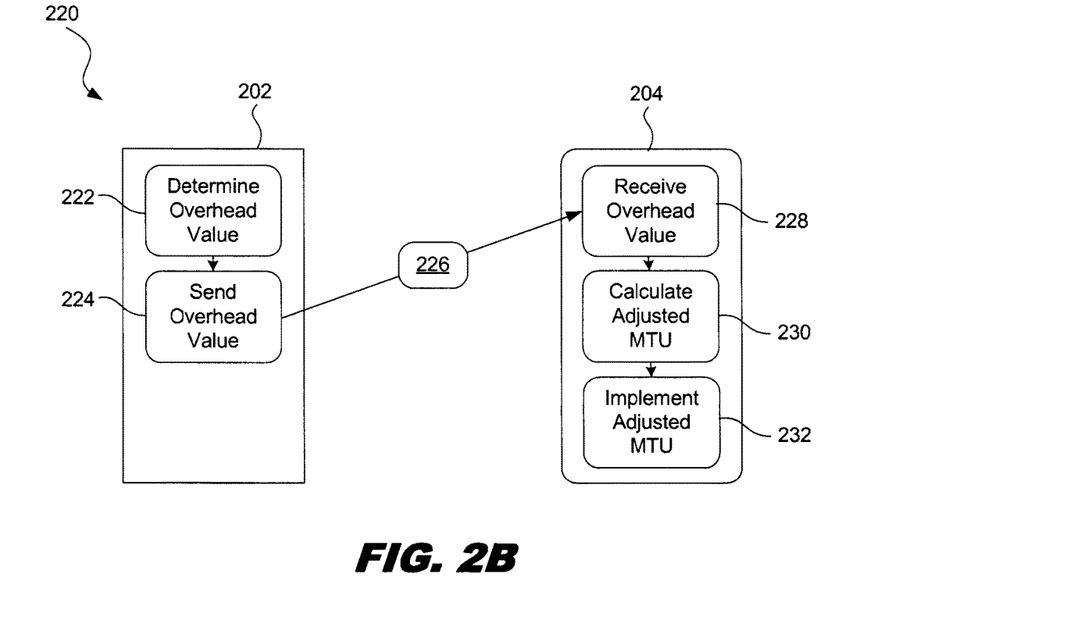
FIG. 2B is a diagram showing an illustrative transfer of encapsulation overhead data from the host to the guest, according to one example of principles described herein.

FIG. 2B is a diagram showing an illustrative transfer of encapsulation overhead data from the host to the guest. In this example, the host system 202 sends the overhead value to the virtual machine 204 and the virtual machine 204 determines the adjusted value. The method 220 starts when the host system determines 222 the overhead value. As described above, the host system 202 knows this information because the host system 202 runs the virtual network environment. For example, the host system 202 runs the hypervisor which may define the virtual network environment and therefore the encapsulation method used for the virtual networks.

The host system 202 then sends 224 the overhead value 226 to the virtual machine. This may be done in a variety of ways. For example, as will be described in further detail below, the overhead value 226 may be passed to the virtual machine 204 during the driver loading process. The virtual machine 204 receives 228 the overhead value 226 through whatever mechanism is used to pass the value 226 form the host system 202 to the virtual machine 204.

The virtual machine 204 then calculates 230 the adjusted MTU value. This may be a simple calculation. Specifically, the calculation may be the host MTU minus the overhead value. As described above, if the host MTU is 1500 bytes and the overhead value is 40 bytes, then the adjusted MTU is 1460 bytes.

The virtual machine 204 can then implement 232 the adjusted MTU value. As described above, in some cases, the virtual machine is not aware that the MTU value is an adjusted MTU value. Rather, the virtual machine 204 receives the MTU value 212 from the host machine and adheres to that value as it would if the adjusted MTU value were the host MTU value. Because the virtual machine will not send out a data packet that is larger than the adjusted MTU, the addition of the encapsulation overhead will not cause the encapsulated data packet to exceed the host MTU used by the networking protocols used to transmit the data packets.

In some examples, a virtual machine nay itself host a virtual machine. This is often referred to as nested virtualization. In such case, the total overhead for each layer of virtualization may be taken into account when determining a final adjusted MTU for the nested virtual machine. Specifically, the final adjusted MTU value for the nested virtual machine may be the host MTU value minus the overhead value used by the host system and minus any overhead used by the virtual machine running directly on the host system.

Figure 3:
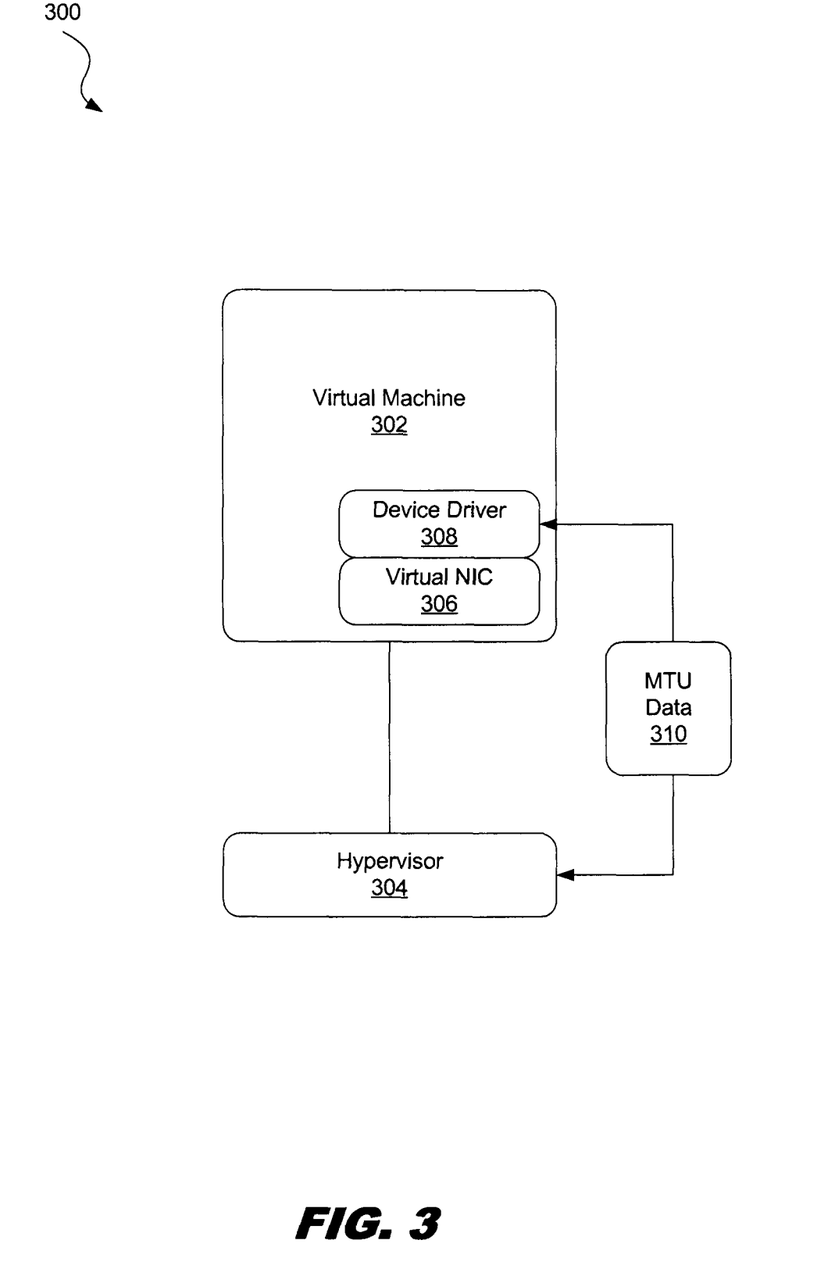
FIG. 3 is a diagram showing an illustrative transfer of MTU data with a device driver negotiation, according to one example of principles described herein.

FIG. 3 is a diagram showing an illustrative transfer of MTU data with a device driver negotiation. When a virtual machine 302 is first loaded onto a host system, the hypervisor 304 provides the virtual machine 302 with device drivers 308 for the virtual components, such as a virtual network interface card 306. The device drivers 308 instruct the virtual components of the virtual machine 302 how to operate with the virtual environment provided by the hypervisor 304.

In one example, the hypervisor may use an I/O virtualization framework referred to as virtio to load the drivers. Part of the virtio standard defines what is referred to as feature vectors. A feature vector is a 32 bit wide bitmap of features. There is a corresponding device vector and guest vector. The device essentially announces its available features through use of the feature vector. The guest may respond with the guest vector for that indicates which of the features within the device vector that the guest supports as well.

In one example, a bit within the feature vector may be used to indicate support for transfer of the adjusted MTU value. For example, when both the device vector and the guest vector have the same feature, then an additional field in the struct virtio_net_config can be added. Thus, the struct may appear as follows:

```
struct virtio_net_config {
    u8 mac [6]
    u16 status;
    u16 max_virtqueue_pairs;
    u16 adjusted_MTU;
};
```

The last field in the struct shown above indicates a value for the adjusted MTU. This can inform the network device of the virtual machine that this MTU should be used instead of the standard. In another example, the struct may appear as follows:

```
struct virtio_net_config {
    u8 mac [6]
    u16 status;
    u16 max_virtqueue_pairs;
    u16 host_overhead;
};
```

Thus, the last field in the struct show above indicates an overhead of 40 bytes. The virtual machine will then know to reduce the MTU used by 40 bytes. The examples shown above related to passing MTU data through the virtio_net_config struct is merely one example of how information may be passed from the host system to the virtual machine. Other methods are contemplated.

In some examples, the virtual NIC 306 may emulate a physical NIC. Thus, the virtual NIC is designed to emulate the hardware of a physical network device. In some examples, the virtual NIC 306 is a paravirtualized device. Paravirtualization is a virtualization technique that presents a software interface to virtual machines that is similar, but not necessarily identical, to that of the underlying hardware. The modified interface can reduce the portion of the guest's execution time spent performing operations that are substantially more difficult to run in a virtual environment compared to a physical environment. This can allow for more efficient operations by the hypervisor when interfacing with the virtual NIC.

Figure 4:
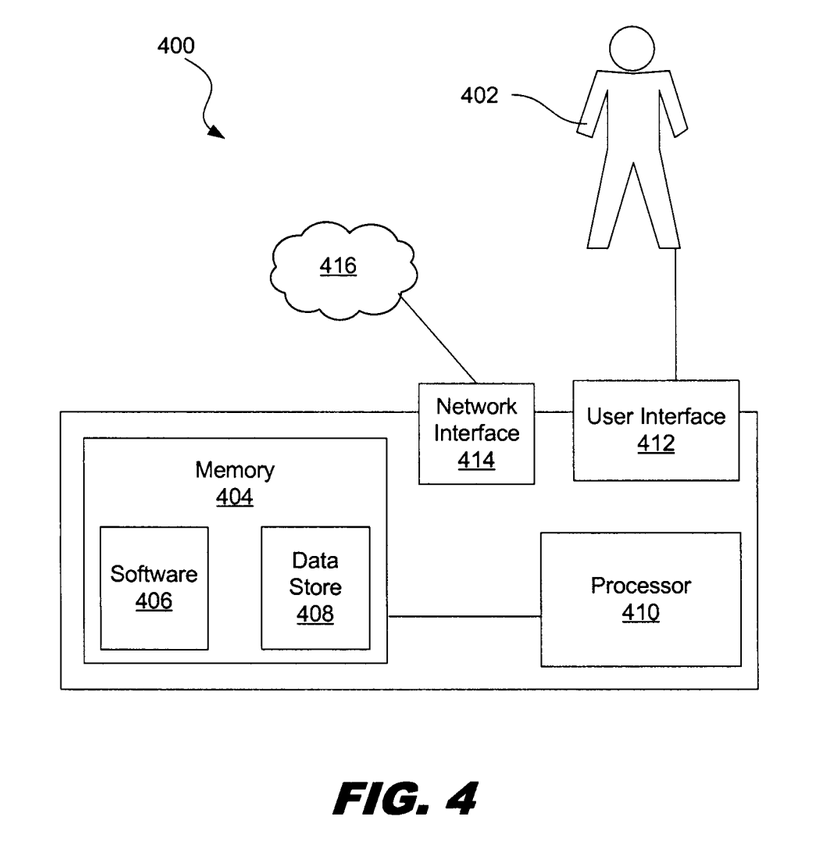
FIG. 4 is a diagram showing an illustrative computing system that may be used to run a number of virtual machines, according to one example of principles described herein.

FIG. 4 is a diagram showing an illustrative computing system that may be used to run a number of virtual machines. According to certain illustrative examples, the computing system 400 includes a memory 404 which may include software 406 and a data store 408. The computing system 400 also includes a processor 410, a network interface 414, and a user interface 412.

The memory 404 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 406 and data in the data store 408.

The computing system 400 also includes a processor 410 for executing the software 406 and using or updating the data 408 stored in memory 404. The software 406 may include an operating system and various other software applications. For example, the software may include a hypervisor. As described above, a hypervisor is used to manage multiple virtual machines.

The user interface 412 may include a number of input devices such as a mouse, touchpad, or touchscreen that allow the user 402 to interact with a GUI. The user interface 412 may also include a number of different types of output devices such as a monitor or a touchscreen. The user interface allows the user 402 to interact with the computing system 400.

The network interface 414 may include hardware and software that allows the processing system 400 to communicate with other processing systems over a network 416. The network interface 414 may be designed to communicate with the network 416 through hardwire media such as Ethernet, coaxial, fiber-optic, etc. The network interface 416 may also be designed to communicate with the network 416 using wireless technologies.

The computing system 400 may be networked to multiple similar computing systems. Each computing system may have a hypervisor designed to run several virtual machines. These virtual machines may be interconnected through a virtual network as described above. To prevent the length of data packets from exceeding the MTU, the hypervisors of the computing systems can pass an adjusted MTU value to the virtual machines. The virtual machines will then enforce that value. Alternatively, the hypervisors can pass an overhead value. The virtual machines can then determine the adjusted MTU and enforce that adjusted MTU.

Figure 5:
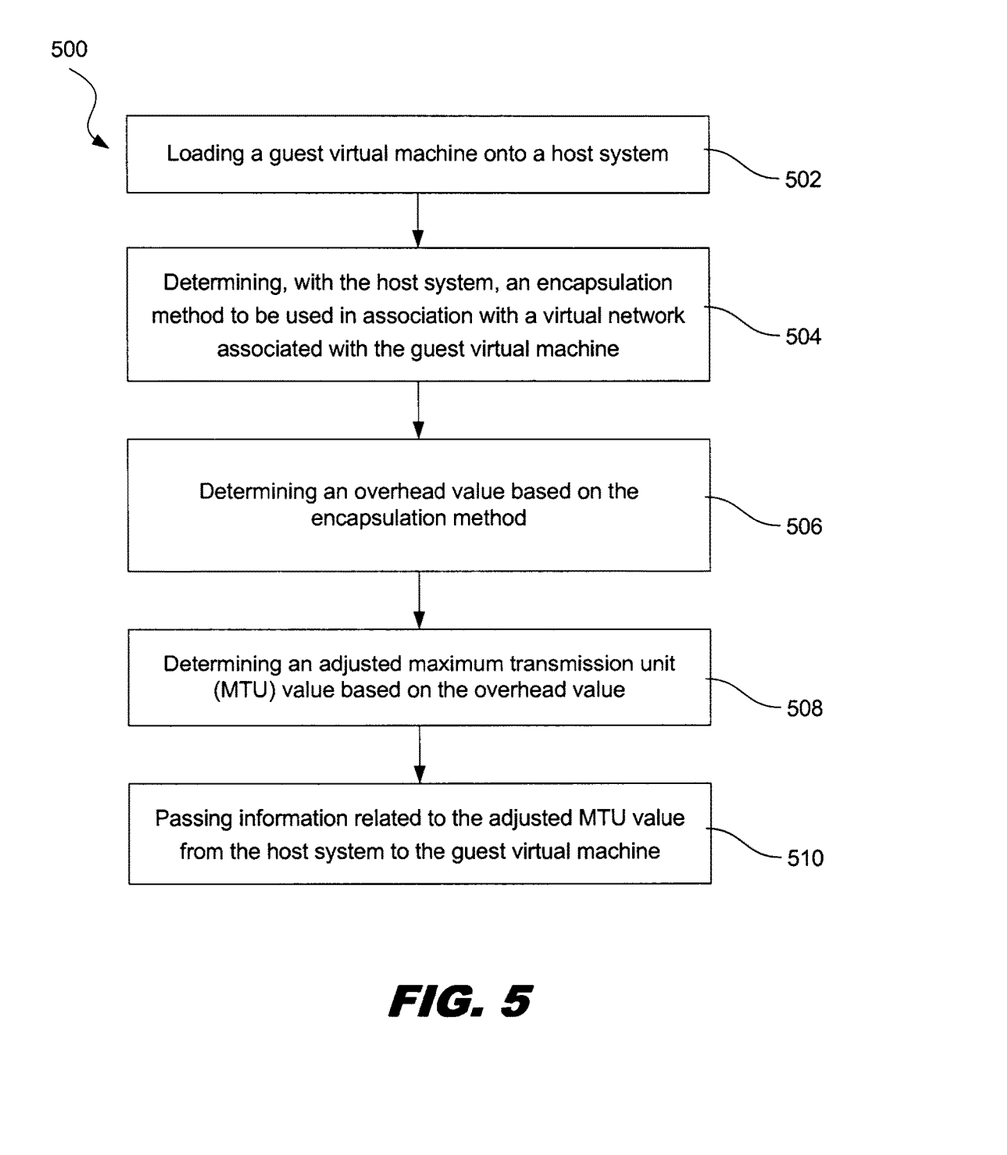
FIG. 5 is a flowchart showing an illustrative method for overhead management for virtual machines, according to one example of principles described herein.

FIG. 5 is a flowchart showing an illustrative method 500 for overhead management for virtual machines. According to the present example, the method 500 includes, loading 502 a guest virtual machine onto a host system. This may be done by a hypervisor running on the host system. The virtual machine may be one of many guest virtual machines.

The method 500 further includes determining 504, with the host system, an encapsulation method to be used in association with a virtual network associated with the guest virtual machine. The host system may use different encapsulation methods for different virtual networks. Thus, the host system can determine which encapsulation method is to be used for a virtual network to which the guest virtual machine will belong. As described above, virtual machines running on one or more host systems may be segregated into virtual networks. In some cases, the virtual networks correspond with the entity that has use of those virtual machines within the virtual network.

The method 500 further includes determining 506 an overhead value based on the encapsulation method. Different encapsulation methods may have different overhead values. Thus, the relevant overhead value is determined based on whatever encapsulation method will be used to route traffic from the guest virtual machine.

The method 500 further includes determining 508 an adjusted maximum transmission unit (MTU) value based on the overhead value. This may be performed by either the guest virtual machine or the host system. For example, if a host MTU is 1500 bytes and the overhead value is 50 bytes, then the adjusted MTU value would be 1450 bytes. If the guest virtual machine uses the adjusted MTU value as the maximum packet length, then the overhead used by the virtual networks will not cause the packets to exceed the host MTU of 1500 bytes.

The method 500 further includes passing 510 information related to the adjusted MTU value from the host system to the guest virtual machine. If determining the adjusted MTU value is performed by the host system, then the information being passed includes the adjusted MTU value. If determining the adjusted MTU value is performed by the virtual machine, then the information includes the overhead value.

Figure 6:
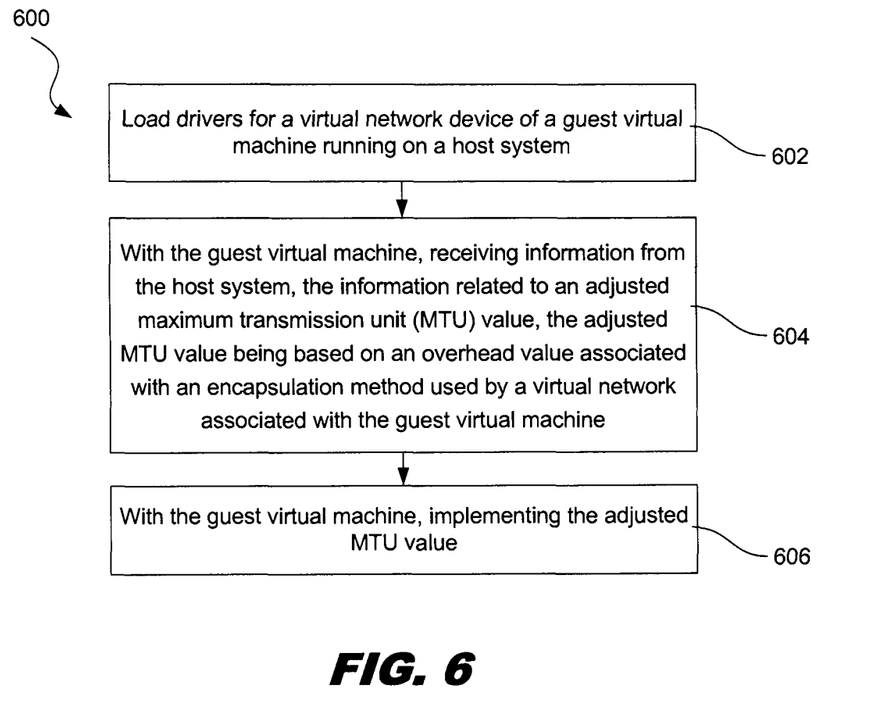
FIG. 6 is a flowchart showing an illustrative method for overhead management for virtual machines, according to one example of principles described herein.

FIG. 6 is a flowchart showing an illustrative method 600 for overhead management for virtual machines. According to certain illustrative examples, the method 600 includes loading 602 drivers for a virtual network device of a guest virtual machine running on a host system. These drivers allow the virtual network device to interact with the virtual network managed by the host system.

The method 600 further includes, with the guest virtual machine, receiving 604 information from the host system, the information related to an adjusted maximum transmission unit (MTU) value, the adjusted MTU value being based on an overhead value associated with an encapsulation method used by a virtual network associated with the guest virtual machine. The value that is received from the host system may be the adjusted MTU value itself. Alternatively, the value may be the overhead value. The adjusted MTU value can then be determined by subtracting the overhead value from the host MTU.

The method 600 further includes, with the guest virtual machine, implementing 606 the adjusted MTU value. With the adjusted MTU value being enforced, the final packet length of data packets being routed through the virtual network should not exceed the host MTU based on the added overhead. Thus, there will be less packet drop or packet fragmentation.

Some examples of processing systems described herein may include non-transient, tangible, machine readable media that include executable code that when run by one or more processors (e.g., processor 410) may cause the one or more processors to perform the processes of methods 500 and 600 as described above. Some common forms of machine readable media that may include the processes of methods 500 and 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
   loading a guest virtual machine onto a host system;
   determining, with the host system, an encapsulation method to be used in association with a virtual network associated with the guest virtual machine;
   determining an overhead value based on the encapsulation method;
   determining an adjusted maximum transmission unit (MTU) value based on the overhead value;
   with a hypervisor of the host system, passing information related to the adjusted MTU value from the host system to the guest virtual machine; and
   with the hypervisor, passing information related to a new adjusted MTU value from the host system to the guest virtual machine in response to determining a change in the overhead value, the change in the overhead value being due to a change in encapsulation method for the virtual network, wherein the passing information related to the adjusted MTU value to the guest virtual machine is performed during loading of a virtual network device driver of the guest virtual machine.

2. The method of claim 1, wherein determining the adjusted MTU value is performed by the host system.

3. The method of claim 1, wherein the information comprises the adjusted MTU value.

4. The method of claim 1, wherein determining the adjusted MTU value is performed by the guest virtual machine.

5. The method of claim 1, wherein the information comprises the overhead value.

6. The method of claim 1, wherein the virtual network device is one of: a paravirtualized device and an emulated device.

7. The method of claim 1, further comprising:
   loading a nested virtual machine onto the guest virtual machine; and
   passing a final adjusted MTU value to the nested virtual machine, the final adjusted MTU value being based on the overhead value and any overhead used by the guest virtual machine.

8. The method of claim 1, wherein the adjusted MTU value is the overhead value subtracted from a host MTU value.

9. A method comprising, loading drivers for a virtual network device of a guest virtual machine running on a host system, the host system using a host maximum transmission unit (MTU) value;
   with the guest virtual machine, receiving information from a hypervisor of the host system, the information related to an adjusted MTU value, the adjusted MTU value being based on an overhead value associated with an encapsulation method used by a virtual network associated with the guest virtual machine; and
   with the guest virtual machine, implementing the adjusted MTU value;
   with the guest virtual machine receiving additional information related to a new adjusted MTU value in response to a change in the host MTU value, the change in host MTU value being due to a change in encapsulation method for the virtual network, wherein receiving the information related to the new adjusted MTU value is performed during loading of a virtual network device driver of the guest virtual machine.

10. The method of claim 9, wherein the host system determines the adjusted MTU value by subtracting the overhead value from the host MTU value, the information received from the host system comprising the adjusted MTU value.

11. The method of claim 9, wherein the guest virtual machine determines the adjusted MTU value by subtracting the overhead value from the host MTU value, the information received from the host system comprising the overhead value.

12. The method of claim 9, further comprising, receiving a notification that includes another new adjusted MTU value.

13. The method of claim 12, wherein receipt of the notification is in response to one of: migration of the guest virtual machine to a host system implementing a different host MTU value, change in the host MTU value, and change in the overhead value.

14. The method of claim 9, wherein the virtual network device is one of: a paravirtualized device and an emulated device.

15. A virtual network environment comprising:
  at least one host system comprising a processor and a memory, the host system using a host maximum transmission unit (MTU) value; and
  a plurality of guest virtual machines running on the host system, the guest virtual machines being separated into virtual networks in a manner that is transparent to the guest virtual machines;
  wherein, the host system is to:
    determine an overhead value based on an encapsulation method used by a virtual network associated with the plurality of guest virtual machines; and
    with a hypervisor of the host system, pass an adjusted MTU value to a guest virtual machine, the adjusted MTU value based on the overhead value, wherein the adjusted MTU value is passed to the guest virtual machine during loading of a virtual network device driver of the guest virtual machine; and
    with the hypervisor, receiving a new adjusted MTU in response to a change in the overhead value, the change in the overhead value being due to a change in encapsulation method for the virtual network.

16. The virtual network environment of claim 15, wherein the host system is further to notify the guest virtual machines of a new adjusted MTU value.

17. The virtual network environment of claim 15, wherein the adjusted MTU value is the overhead value subtracted from the host MTU value.

* * * * *